Jan. 9, 1968 R. W. SANDERSON 3,362,742
HYDRAULIC SHOCK ABSORBER
Filed Jan. 24, 1966
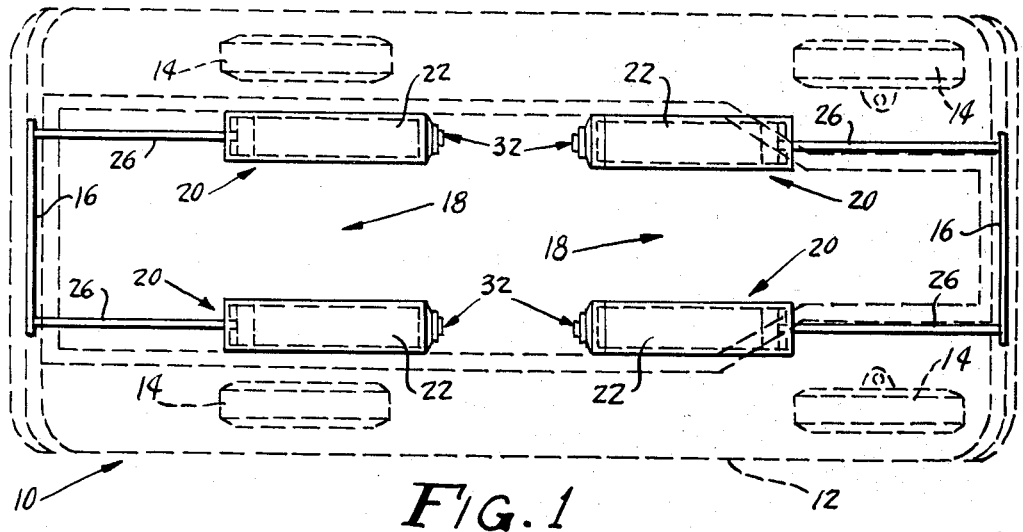
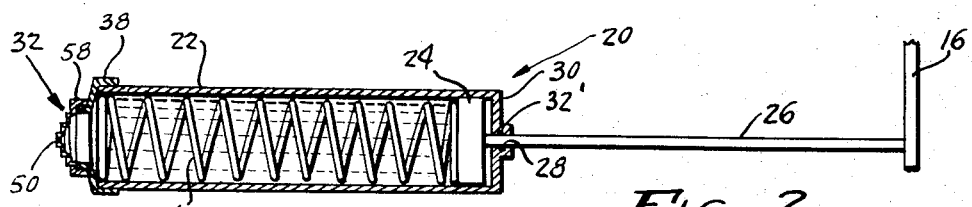
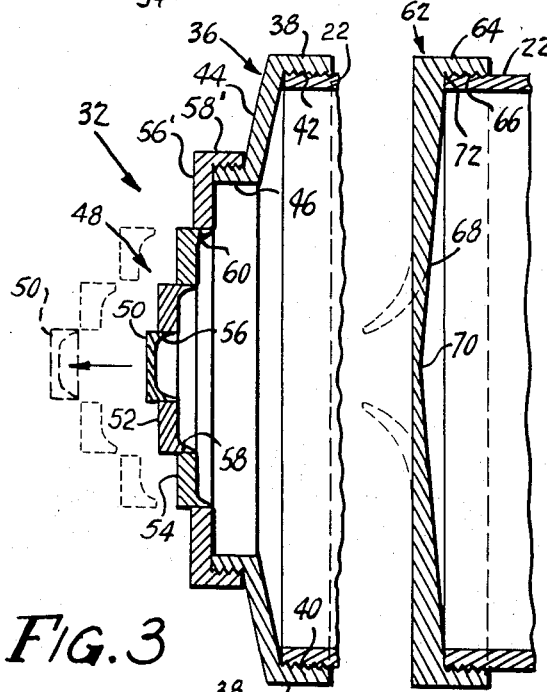
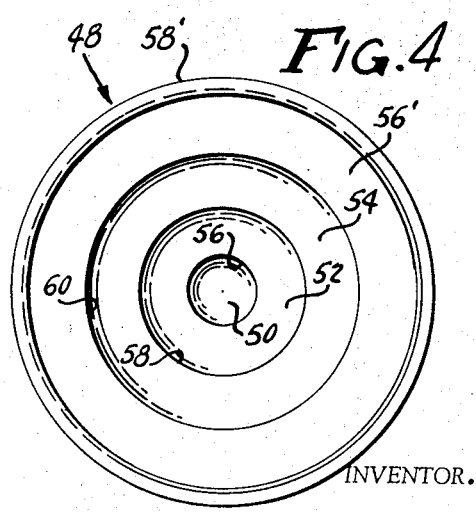
INVENTOR.
RALPH W. SANDERSON.
BY Kimmel, Crowell & Weaver
ATTORNEYS.

United States Patent Office 3,362,742
Patented Jan. 9, 1968

3,362,742
HYDRAULIC SHOCK ABSORBER
Ralph W. Sanderson, 1415 Holly St. NW.,
Washington, D.C. 20012
Filed Jan. 24, 1966, Ser. No. 522,711
8 Claims. (Cl. 293—1)

ABSTRACT OF THE DISCLOSURE

This patent discloses a hydraulic shock absorber particularly adapted for use on vehicles for dissipating energy when a vehicle collides with another object. Two embodiments of the shock absorber are disclosed. In the first embodiment, an incompressible fluid containing cylinder is provided with a piston which may be connected to the vehicle bumper and with a cap which has a plurality of concentric blowout plugs of increasingly larger diameter. The blowout plugs are releasably held in the next larger plug and in the cap for being blown out intact individually depending upon the degree of force which results from the collision of the vehicle. A larger force results in a shock wave which blows out a larger plug to thereby more rapidly dissipate the energy of the collision. In the second embodiment, the cap is of continuously decreasing thickness from the outside to the inside to provide, in effect, an infinite number of concentric blowout segments. In this embodiment, a larger aperture is formed when the vehicle collides with greater force.

This invention relates to a hydraulic shock absorber of the type which may be operatively carried by a vehicle and connected with a bumper thereof such that when the vehicle strikes another object, such as during a collision, a substantial part of the impact forces will be absorbed by the shock absorber thus lessening the damage to the automobile and diminishing the possibility of serious injury to the occupants.

It has been found that the energy of colliding vehicles may be dissipated or absorbed by the provision of a shock absorbing device in which a captive fluid is released by the impact forces resulting from a collision. It has been found that one difficulty in such a device is that it must be constructed such that the captive fluid is released upon the buildup of pressure to a determined point. Accordingly, if the device is constructed such that a relatively moderate impact will release the captive liquid, the forces resulting from a much larger impact will not be dissipated to the extent that serious injury is avoided. Similarly, if the device is constructed such that a relatively large impact is needed to release the captive liquid, a much smaller force will not activate the shock absorbing device resulting in a total failure to dissipate the forces produced by the colliding bodies.

It is accordingly an object of the instant invention to provide a shock absorbing device for attachment to a vehicle to dissipate the forces produced by a collision.

Another object of the instant invention is to provide a shock absorbing device of the character described which regulates the energy dissipated in accordance with the severity of the collision.

Still another object of the instant invention is to provide a shock absorbing device for attachment in operative relation to a vehicle in which a quantity of captive liquid is carried by the shock absorber and released therefrom by the forces of collision.

A more specific object of the instant invention is to provide a shock absorber of the character described in which a captive fluid is held within a housing, the housing being provided with segments arranged to form different sized apertures which will be selectively opened in accordance with the severity of the collision.

Another more specific object of the instant invention is to provide a shock absorber of the character described in which the differently sized apertures are closed by releasable plugs which separate therefrom upon the imposition of a predetermined pressure within the shock absorber.

A further object of the instant invention is to provide a combination vehicle and shock absorbing device for dissipating the forces of collision between the vehicle and another object.

A still further object of the instant invention is to provide a combination vehicle and shock absorber for the purposes explained in which the shock absorber releases a captive fluid in accordance with the severity of the collision.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a view of a plurality of shock absorbers of the instant invention, shown in solid lines, in operative relation with a vehicle shown in dash lines;

FIGURE 2 is an enlarged longitudinal cross sectional view of the shock absorbing device of the instant invention;

FIGURE 3 is an enlarged longitudinal cross sectional view of one end of the shock absorbing device of the instant invention illustrating the construction of the variable aperture of the instant invention;

FIGURE 4 is an end elevational view of the shock absorber of FIGURE 3 illustrating the variable aperture closure; and FIGURE 5 is a longitudinal cross sectional view of another form of variable aperture closure of the instant invention.

Referring now to the drawing in detail, wherein like reference characters designate like elements throughout the several views thereof, there is indicated generally at 10 a vehicle equipped with a conventional vehicle body 12, a plurality of wheels 14 and a pair of bumpers 16 movably mounted with respect to body 12 with a pair of shock absorber assemblies shown generally at 18 providing one interconnection between body 12 and bumpers 16, although it should be understood that a suitable guide may be provided therefor if deemed necessary. When either of bumpers 16 collide with another object, as by striking an immobile object or in a front or rear end collision, the affected bumper will move inwardly with respect to vehicle body 12 and develop a certain amount of pressure within the shock absorber assembly associated with the affected bumper. The development of pressure within shock absorber assemblies 18 will form an outlet opening for the captive liquid contained therein thereby dissipating a substantial portion of the impact forces.

Each of shock absorber assemblies 18 is comprised of a plurality of sustantially identical shock absorbers indicated generally at 20 receiving therein a slidably mounted piston 24 affixed to a piston rod 26 which is in turn secured to bumper 16, as may be seen best in FIGURE 2. Piston rod 26 extends through a passageway 28 in a closed end wall 30 of housing 22 with a suitable O-ring 32 or other sealing means preventing the escape of a captive liquid disposed in housing 22. Housing 22 also includes another end wall or closure shown generally at 32 sealing the other end of the cylindrical configuration with a helical spring 38 being positioned interiorly of housing 22 to bias piston 24 to the normal position shown in FIGURE 2. It should be apparent that spring 34 also acts as an energy dissipating means for absorbing the forces produced by a collision of vehicle 10 and another object.

Referring now to FIGURES 3 and 4, closure 32 is illustrated as including an annular adapter shown generally at 36 having a circular wall 38 provided with suitable threads 40 interconnected with threads 42 on the outer surface of housing 22. Adapter 36 also includes a conical wall 44 interconnecting circular wall 38 and a smaller circular wall 46 having exterior threads to receive a cap shown generally at 48. Although adapter 36 may be made of any suitable material, it is preferred that it be made of a high strength metal comparable to the metal of which housing 22 is made such that adapter 36 does not fail when the pressure within housing 22 increases to the extent that cap 48 fails, as more fully explained hereinafter.

Cap 48 constitutes a most important part of the instant invention in that it is provided with portions that separate from the remainder of shock absorber 20 to form an outlet, the size of which varies in accordance with the severity of the collision, allowing passage of the captive liquid from within housing 22. Cap 48 includes a first circular segment or plug 50 of predetermined size releasably secured in a second segment or plug 52 which is annular in configuration, as may be seen in FIGURE 4. Second segment 52 is in turn releasably secured in a third segment or plug 54 which is also annular in configuration with segments 50, 52, 54 being substantially concentric. Third segment 54 is releasably received in an annular mounting plate 56' having a circular wall 58' forming interior threads thereon for securement to small circular wall 46 of adapter 36. Plate 56' is preferably made of a strong steel, similar to that of adapter 36 in housing 22 to obviate warping of the threads connecting cap 48 and adapter 36 upon failure of cap 48.

Each of plugs 50, 52, 54 may be secured in its receiver by a friction fit, a shrinkage fit, an adhesive connection, or by forming segments 50, 52, 54 in a one piece component in which the individual segment will separate from the remainder of housing 22 or will rupture to form an aperture of predetermined size.

As may be seen in the embodiment of FIGURE 3, plugs 50, 52, 54 are secured in their respective receivers by a shrinkage fit, a friction fit or by an adhesive connection to form respectively a first aperture 56, a second aperture 58 and a third aperture 60 of progressively increasing sizes to form an outlet aperture for the captive fluid within housing 22.

For purposes of illustration, it is assumed that rightmost bumper 16 of vehicle 10 strikes an immobile object at a relatively slow rate of speed such that piston 24 is rearwardly reciprocated to produce a rearwardly traveling shock wave and to increase the pressure within housing 22. The force tending to separate each of plugs 50, 52, 54 is proportional to the area of the individual plug with the holding forces being proportional, in part, to the area of contact between each plug and its associated receiver. One manner of varying this holding force is by the use of different adhesive compounds in securing the various plugs together or by machining the plugs and the apertures in which they are received to varying tolerances.

Since the holding forces of plugs 50, 52, 54 may be varied and since the forces tending to separate each of the plugs from the remainder of housing 22 varies in proportion to the area of the plug, it will be apparent that a relatively small force, as envisioned by the previous assumption, will separate plug 50 from the remainder of cap 48, as may be seen in the dotted line of FIGURE 3. The pressuring of the captive liquid within housing 22, which may be a hydraulic fluid, water, or any other relatively incompressible liquid, as well as the energy necessary to separate plug 50 from cap 48 will considerably dissipate the collision forces between vehicle 10 and the object with which it collides. In addition, it should be noted that helical spring 34 will absorb a considerable amount of energy.

When vehicle 10 strikes an object with a relatively greater impact, a stronger shock wave will be induced within housing 22 and the pressure therein will be increased above that of the previous example. Depending on the magnitude of the shock wave and pressure increase, either plug 52 or plug 54 will separate from cap 48, thereby diminishing the impact forces felt by vehicle 10 by the energy necessary to compress the liquid within housing 22, to compress spring 34, to create the rearwardly traveling shock wave, and to separate the larger plug from its receiver. Because the shock wave is the primary means by which each of plugs 50, 52, 54 is separated from cap 48, it has been found that a high order shock wave simultaneously separates, in one piece, the largest segment that will be separated and the smaller segments.

If cap 48 is cast in a one piece sheet, which may be of aluminum or other similar material, the thicknesses of plugs 50, 52, 54 may be varied as shown in FIGURE 3 such that the smaller area plug will fail first and will either be wholly separated from cap 48 or ruptured to form an aperture for the release of captive fluid within housing 22. Similarly, segment 52 is of an intermediate thickness with segment 54 being the most resistant to pressure failure.

Referring now to FIGURE 5, another form of cap is shown generally at 62 having a circular wall 64 equipped with interior threads 66 for securement with smaller circular wall 46 of adapter 36. A closure wall 68 closes the opening formed by circular wall 64 and is illustrated as having a thickness that varies infinitely from the weakest area 70 to the strongest area 72. Equipping shock absorber 20 with cast unitary cap 62 will produce an aperture formed by the rupturing of closure wall 68 upon the impact of bumper 16 with another object. The size of the aperture produced thereby will be a function of the severity of collision. As the magnitude of the shock wave within housing 22 increases and as the magnitude of the pressure buildup therein increases above a level sufficient to rupture the weakest area 70 of the wall 68, wall 68 will form a rupture which will extend generally from the weakest area 70 toward the stronger area 72. The size of the opening produced by such a rupture will be limited by the increasing thickness of closure wall 68 to produce a variable aperture similar to that produced by cap 48.

It is now seen that there is herein provided an improved hydraulic shock absorber which accomplishes all of the objects and advantages of the instant invention and others, including many advantages of great practical utility and commercial importance.

While this invention has been described with reference to two specific embodiments and the abstract of the disclosure is specific to these embodiments in order to permit easy review of the disclosure, it should be understood that neither the abstract nor the reference to the specific embodiments is intended in the limiting sense. Rather, it is intended that the disclosure and this abstract be considered as drawn to aid in understanding the invention and not in limiting the scope thereof. It is further intended that the scope of the invention shall be limited only by the scope of the appended claims.

I claim:

1. In a device for dissipating the collision force of an object of the type which includes an elongate hollow housing having ends, a piston in the housing normally spaced from one end thereof, means extending through the other end for connecting the housing to an impact receiving member, means for connecting the housing to the object and an end closure on said one end of the housing, said end closure together with the piston and the housing defining an enclosed chamber for receiving a substantially incompressible liquid, the improvement wherein the end closure is constructed and adapted to separate sequentially into a plurality of components and comprises:
  (a) a generally annular member frictionally fitted in said one end of the housing; and
  (b) an end closing member frictionally fitted in said annular member, said end closing member being adapted to be separated from the annular member upon the application of an impact pressure thereto and said annular member being adapted to be separated from the housing upon the application of a greater pressure thereto.

2. The invention of claim 1 wherein the housing further comprises:
  (a) a removable collar secured on said one end of the housing, said annular member being frictionally fitted in said collar.

3. The invention of claim 2 wherein the end closing member comprises:
  (a) at least one additional annular member frictionally fitted in the first named annular member; and
  (b) an end plug frictionally fitted in the second named annular member, said plug and second named annular member being adapted to be sequentially separated from each other by the application of successively increasing pressure.

4. The invention of claim 3 further comprising:
  (a) a spring in the housing biasing the piston away from said one end of the housing.

5. The invention of claim 2 further comprising:
  (a) a spring in the housing biasing the piston away from said one end of the housing.

6. The invention of claim 1 wherein the end closing member comprises:
  (a) at least one additional annular member frictionally fitted in the first named annular member; and
  (b) an end plug frictionally fitted in the second named annular member, said plug and second named annular member being adapted to be sequentially separated from each other by the application of successively increasing pressures.

7. The invention of claim 6 further comprising:
  (a) a spring in the housing biasing the piston away from said one end of the housing.

8. In a device for dissipating the collision force of an object of the type which includes an elongate hollow housing having ends, a piston in the housing normally spaced from one end thereof, means extending through the other end for connecting the housing to an impact receiving member, means for connecting the housing to the object and an end closure on said one end of the housing, said end closure together with the piston and a substantially incompressible liquid, the improvement the housing defining an enclosed chamber for receiving wherein the end closure comprises:
  (a) a cap secured to said one end of the housing, said cap having a first thickness in the central area thereof and a greater thickness in the peripheral area thereof and a substantially continuously increasing thickness in the area intermediate the central area and the peripheral area, said cap being adapted to sequentially fracture in the central area, upon the application of an impact pressure, and in the peripheral area, upon the application of a greater pressure.

References Cited

UNITED STATES PATENTS

| | | | |
|---|---|---|---|
| 1,702,675 | 2/1929 | Ventura | 293—51 |
| 1,799,894 | 4/1931 | Fritsch | 293—51 |
| 2,090,659 | 8/1937 | Zirmer et al. | 293—51 |
| 2,712,913 | 7/1955 | Stanley | 244—138 |
| 2,713,466 | 7/1955 | Fletcher et al. | 244—138 |
| 2,714,011 | 7/1955 | Albee | 280—1 |
| 2,964,139 | 12/1960 | Wittl et al. | 188—87 |
| 2,997,325 | 8/1961 | Peterson | 293—1 |
| 3,284,122 | 11/1966 | Rich | 293—1 |

ARTHUR L. LA POINT, *Primary Examiner.*

H. BELTRAN, *Assistant Examiner.*